(12) United States Patent
Wang et al.

(10) Patent No.: US 7,212,507 B2
(45) Date of Patent: May 1, 2007

(54) PROCEDURE TO DETERMINE RADIO LINK CONDITION USING RADIO LINK CONTROL LAYER OBSERVATIONS

(75) Inventors: Jianyu Wang, Ottawa (CA); Robin Hudson, Carleton Place (CA); Patrick Lie Chin Cheong, Nepean (CA); Frederic Ratovelomanana, Paris (FR); Olivier Isnard, Viroflay (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 808 days.

(21) Appl. No.: 10/678,131

(22) Filed: Oct. 6, 2003

(65) Prior Publication Data
US 2005/0073989 A1    Apr. 7, 2005

(51) Int. Cl.
*H04Q 7/00* (2006.01)
(52) U.S. Cl. .................... 370/329; 455/452.2
(58) Field of Classification Search ............ 370/328, 370/329, 331–332; 455/450–451, 452.1, 455/452.2, 63.1, 67.13, 509
See application file for complete search history.

(56) References Cited

U.S. PATENT DOCUMENTS 7,120,448 B2 * 10/2006 Brouwer ............... 455/453
2004/0110521 A1 * 6/2004 Soldani et al. ......... 455/509

* cited by examiner

*Primary Examiner*—Nguyen T. Vo
(74) *Attorney, Agent, or Firm*—Borden Ladner Gervais LLP

(57) ABSTRACT

A method of controlling the performance of a radio link between a base transceiver station and a radio terminal for a wireless transmission system is provided. A radio network controller (RNC) monitors a directly observable L-2 parameter, and determines a without explicit L2-L1 signaling a threshold violation by the L-1 parameter for accordingly triggering a status change of the radio link. Namely, a L-2 radio resource management algorithm prompts the radio terminal and the RNC to perform a radio resource management action whenever the L-1 parameter violates a L-1 threshold. Such an action could be directly downgrading or upgrading the transmission rate on the radio link, or a radio link reconfiguration. The L-1 parameter may be the radio block error rate r, and the L-2 parameter may be the PDU retransmission rate R.

25 Claims, 3 Drawing Sheets

PROCEDURE TO DETERMINE RADIO LINK CONDITION USING RADIO LINK CONTROL LAYER OBSERVATIONS

BACKGROUND OF THE INVENTION

1. Field of the Invention

This invention relates to wireless data networks and is directed in particular to a procedure for determining a condition of a radio link using radio link control layer observations.

2. Description of the Prior Art

Emerging multimedia digital wireless systems, such as Nortel's UMTS (universal mobile telecommunication system) are designed to support higher data rates than the current narrowband digital networks such as the GSM (global system for mobile) cellular communication system. The architecture of multimedia digital wireless systems is somewhat similar to that of the GSM, in that they are also organized into geographically-defined cells, with a base transceiver station (BTS) that controls operation of all mobile radio terminals present in the area covered by the BTS. BTS (also called "Node-B") hosts radio transmission/reception equipment for operating a number of radio channels, maintains authorization and registration of the mobile terminals, handles channel allocations for all active communication sessions, etc.

Typically, a group of base transceiver stations communicate with one or more radio network controllers RNC located throughout a certain territory. A RNC is analogous with what is referred to as a Base Station Controller (BSC) in GSM. Each radio network controller is responsible with controlling operation of the base transceiver stations coupled to it, and hosts for example the radio equipment for a public line mobile network (PLMN), transcoder units (TCU) and portable communication units (PCU). A RNC is in turn coupled to a mobile gateway mobile switching center, which performs switching operations for both circuit-switched and/or packet-switched communications.

Layered architecture is a form of hierarchical modularity used in data network design, where each layer performs a category of functions or services using information from the immediately upper or lower layers. The OSI (Open System Interconnections) model defines a Physical Layer (Layer 1), a Data Link Layer (Layer 2), a Network Layer (Layer 3), a Transport Layer (Layer 4) and one or more Application Layers (Layers 5 to 7).

The Physical Layer (L-1) specifies the standards for the transmission medium, which is a radio (wireless) link in case of wireless networks. A wireless link is characterized by a higher bit error rate than a wired link, due to RF environment such as fading and effects of interference etc, and low transmission power available to the mobile terminal. In addition, the radio link is not symmetrical and the bandwidth of a transmission channel rapidly fluctuates over time. Furthermore, in a wireless environment, the amount of bandwidth available is fixed and scarce. Adding bandwidth to a radio link may be expensive or even impossible due to regulatory constraints. Still further, part of the bandwidth needs to be used in signalling and error correction, which reduce the bandwidth allocated to the payload.

Data Link Layer (L2), which is called the Radio Link Control (RLC) layer for wireless data networks, performs control protocols used to mitigate the effects of impairments introduced by the physical transmission medium. In the case of a wireless network, the RLC protocols are designed to deal specifically with the types of impairments found on the radio link and comprise mechanisms to deal with errors on the link, delays encountered in transmitting information, lost information, bandwidth conservation, and contention resolution.

Layers 3–7 are less relevant to the present invention and as such are not discussed further.

Since the main limitation in the wireless systems is the scarcity of the radio resources (power and spectrum), one of the main objective when designing a wireless system is to best utilize the available resources. Various radio resource management (RRM) algorithms have been designed with a view to maximize the capacity and performance of a wireless system, while efficiently using the available radio resource.

Due to the nature of the RRM (radio resource management) functions, most RRM algorithms are implemented at L-2 or above, and usually reside in the RNC (Radio Network Controller). However, for a RRM algorithm to function properly, it is essential that it has the states of the L-1 radio link as the input information; this information is available at the BTS (Base Transceiver Station) and at the mobile terminal. Since in most wireless systems the RNC and the BTS are not co-located, this architecture results in using an important chunk of the available bandwidth for signalling exchanges between these two entities as well as signalling exchanges between RNC and mobile terminal. For example, for wireless data services, radio rate link adaptation schemes are mandatory. The conventional implementation of link adaptation is to use explicit signalling; this occupies link bandwidth within both the air interface and the Iub/backhaul (NodeB/BTS-RNC/BSC interface), as well as adds complexity into the system.

There is a need to reduce the signalling between the user equipment, the BTS, and the RNC, that is necessary for providing the RNC with L-1 operational parameters of the radio link.

SUMMARY OF THE INVENTION

The present invention provides a relationship between a L-2 observable parameter and a L-1 measurable condition of a radio link performance, to determine one from the other.

More specifically, the present invention provides within a wireless transmission system equipped with a radio network controller (RNC) hosting radio resource management algorithms for controlling operation of a base transceiver station (BTS), a method of controlling the performance of a radio link established between the base transceiver station and a radio terminal including the steps of: monitoring from the RNC a L-2 parameter directly observable at the RNC; determining from the L-2 parameter a L-1 parameter, without explicit signaling between the RNC, said BTS and the radio terminal; and from a radio resource management algorithm, prompting the radio terminal and the RNC to perform a radio resource management action whenever the L-1 parameter violates a L-1 threshold.

The present invention also provides a method of obtaining physical layer (L-1) information at radio link control (RLC) layer (L-2) without explicit signaling between L-1 layer and L-2 layer including the steps: deriving a transfer function between a L-2 observable parameter and an L-1 status parameter; obtaining the L-2 observable parameter; applying the transfer function to obtain the L-1 status parameter based on the RLC parameters setting and on an estimation of physical layer information; and triggering a radio resource management action whenever the L-2 parameter violates a L-2 threshold.

Advantageously, no explicit signaling between RNC, Node B and mobile terminal is necessary for radio link rate adaptation mechanisms with the present invention, hence reducing the bandwidth usage in both radio link and lub/backhaul link. By clearly identifying and quantifying the relationship between a RLC observable and a radio link condition, this invention provides a procedure for determining one from the other. It can be used by various radio resource management algorithms in wireless systems to monitor a radio link condition at the RLC layer and to trigger the necessary state change based on a quantized change in the radio link condition.

As well, the invention results in reducing the cost for provisioning and implementing the fast backhaul signaling required to send physical layer measurement information from the BTS node to the RNC.

In addition, the invention reduces the delay incurred by link adaptation (or other radio resource management activities) since the RNC or the mobile terminal does not have to wait and process any external signaling measurement before performing link adaptation. Rather, the RNC or the mobile terminal can react right away if the data transmission indicates a change in radio link conditions. It should be noted that the frequency of Status Reports is the main source of delay (i.e., poor L1 conditions are not "immediately obvious", but become apparent within one expected Status Report)

Any access product that supports data services with a protocol acknowledge mode (ARQ) scheme in radio link layer may use the invention. It can be used in both RNC and mobile terminal.

DETAILED DESCRIPTION OF THE INVENTION

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

Figure 1:
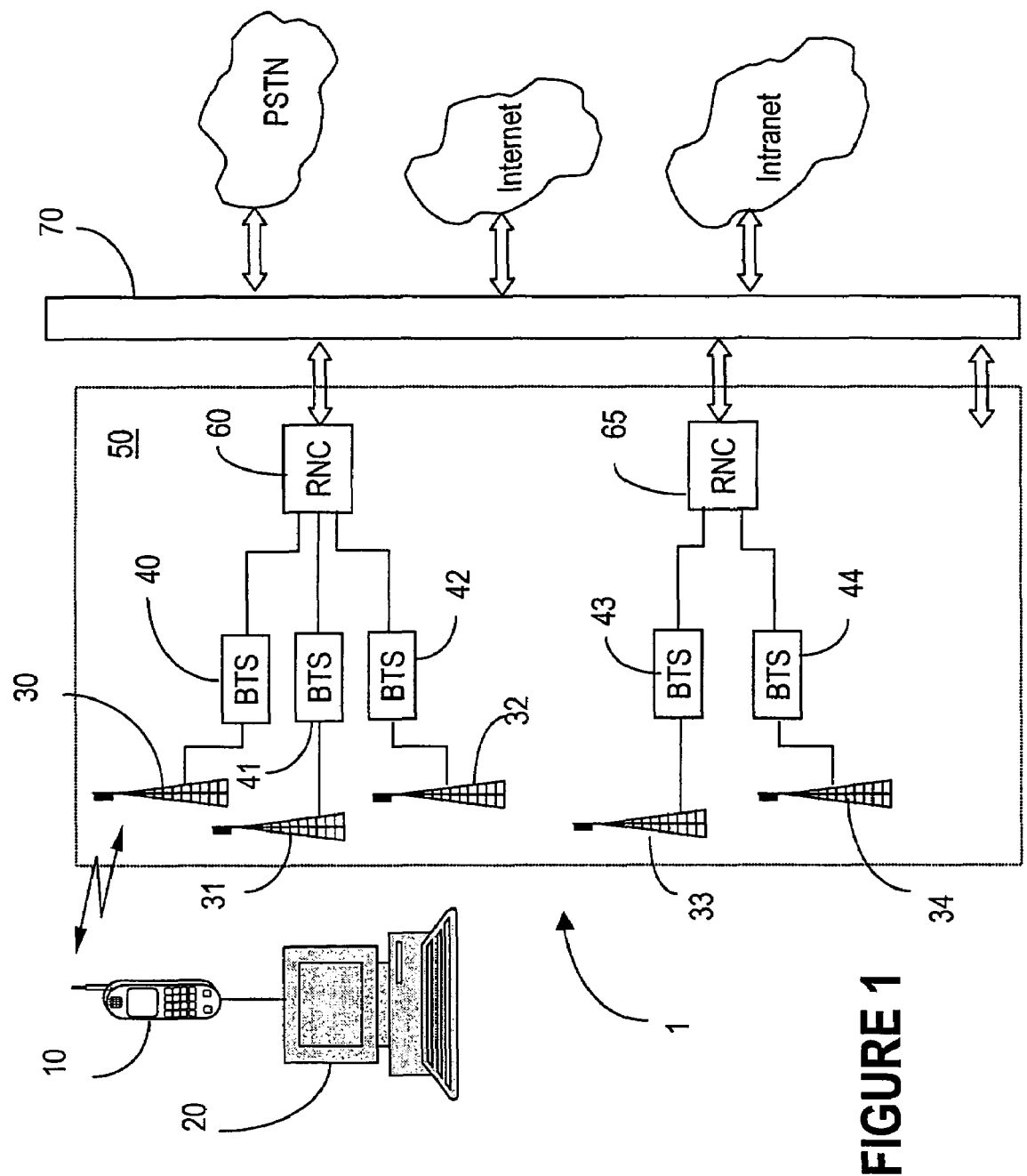
FIG. 1 shows a block diagram of a multimedia digital wireless system that may use the present invention.

FIG. 1 shows a block diagram of a multimedia digital wireless system 1. As described above, system 1 is organized into geographically defined cells, where a base transceiver station (BTS/Node-B) 40–44 controls operation of a mobile radio terminal 10. FIG. 1 also shows BTS antennas 30–34 for exchanging radio signals with the mobile terminal; in this example the mobile 10 is shown in the area covered by antenna 30 of BTS 40. In the example of FIG. 1, BTS's 40–42 are controlled from a RNC 60, and BTS's 43 and 44 are controlled from a RNC 65. BTS's 40–44 and RNC's 60 and 65 make up a radio access network (RAN) 50.

On the client side, the mobile terminal may be connected to a data terminal such as a personal computer 20.

The RNCs are coupled, in turn, to a mobile gateway mobile switching center 70, which performs switching operations for both circuit-switched and/or packet-switched communications. The switching center connects the radio access network 50 to PTSN, Internet or an Intranet.

As mobile radio terminal 10 travels between the wireless cells, the task of routing data between the wired network(s) and the mobile is handed-off to the base transceiver station of the new cell, while maintaining the end-to-end connectivity.

Figure 2:
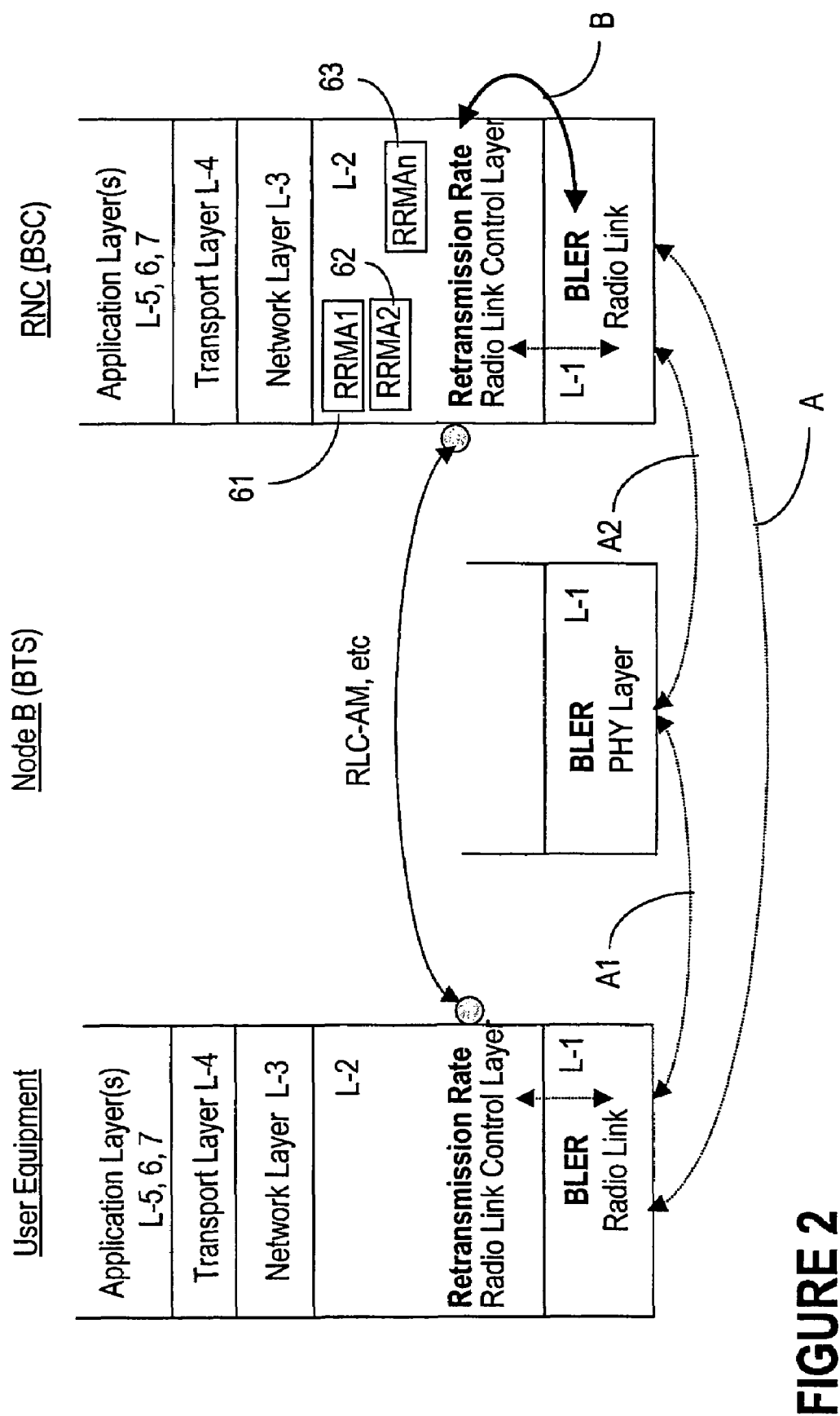
FIG. 2 shows the OSI layers for a wireless system, provided for illustrating the method of the present invention.

FIG. 2 shows the OSI layers for a wireless system, and illustrates the block error rate BLER as the preferred radio link status parameter. BLER measures decoded information reliability of a group of information bits; a block error is defined as one or more bit errors within the group of information bits. Reducing the BLER enhances system performance by, for example, increasing the amount of data that may be communicated (i.e. increasing the data throughput) or, for voice communications, enhancing the perceived quality of the voice communication.

FIG. 2 also shows an observable parameter at the radio link control (RLC) layer (L-2). An observable parameter for a communication session is in a preferred embodiment of the invention the PDU protocol data unit) retransmission rate, which provides a measure of the PDU's received in error.

A plurality of radio resource management algorithms RRMA1 to RRMAn are also intuitively shown by blocks 61, 62 and 63. A RRM algorithm usually makes decisions/triggers actions based on the quality of the radio link. With the current implementations of the RLC, a real time estimation of the downlink (from the RNC to the user equipment) BLER r_c that exceeds a configurable threshold will trigger a status change at a radio resource management algorithm RRMA1/RRMAn. In a similar fashion, a real time estimation of the uplink (from the user equipment to the RNC) BLER r_o could also trigger a status change for uplink radio transmission. This change involves signaling shown by arrows A, A1 and A2 in FIG. 2. Indices 'c' and 'o' are used to indicate that the respective parameter refers to a "considered direction" (downlink or uplink), or to "opposite direction" (uplink or downlink). For simplicity, the index 'c' will be omit from now on (e.g. instead of using r_c for the BLER on the considered direction, we simply use r).

On the other hand, by qualifying a relationship R=f (BLER) between a radio link status parameter and a RLC link observable parameter, the invention circumvents signaling previously necessary to provide the RNC with the radio link status from the BTS and the user equipment.

Rather, an unacceptable increase in the BLER triggers a status change at the RRMA's, as shown by arrow B, prompting both the mobile radio terminal and the RNC to perform various radio resource management actions.

For example, for downlink RNC connections, the invention can trigger radio link reconfiguration based on the estimation of the BLER. It may perform either an upgrade or a downgrade of the link based on a pre-defined BLER threshold. It may also trigger radio link rate adaptation by simply reducing or increasing the number of data blocks per frame (i.e. TFCS) on detection of bad or good radio conditions. No radio link reconfiguration is necessary in this case.

For uplink mobile terminals connections, the invention can similarly trigger link rate adaptation by simply reducing or increasing TFCS on detection of bad or good radio connections. Again, no radio link reconfiguration is required in this case.

As a result, the status change is triggered with minimal cost, since it does not involve real-time measurement of the L-1 BLER, or exchange the signaling messages A, A1, A2.

The following notations are used in this specification:

z=the number of first time transmitted PDUs x=the total number of retransmission PDUs due to the radio link errors, x1=the total number of successfully retransmitted PDUs among all retransmitted PDUs counted by x (group 1), x2=the total number of unsuccessfully retransmitted PDUs among all retransmitted PDUs counted by x (group 2)

y=the number of spurious retransmission PDUs (due to the RLC configuration). Spurious retransmission PDUs are PDUs retransmitted unnecessarily due to a delayed acknowledgement received by the transmitter.

A 'Status Report' represents a one/multiple-PDU message, sent on the same channels as the data; however, the PDUs of the message are not data PDUs. The Status Report system (known as ACK/NACK system in GSM, 1×RTT, etc.) is not changed in any way by invention implementation.

$$y = M \cdot x1 \qquad \text{EQ1}$$

M=the average value of the spurious retransmitted PDUs corresponding to a retransmitted PDU within group 1 (counted by x1).

R=PDU retransmission rate, either in the downlink direction or uplink direction. R is defined as the ratio of the number of retransmitted PDUs and the total number of transmitted PDUs.

r=radio link BLER in the considered direction.

$$R = \frac{\text{number of retransmitted } PDUs}{\text{total number of transmitted } PDUs} \qquad \text{EQ 2}$$

The way to estimate R based on radio link BLER r can be done in two steps: the first step is to calculate R using r and M. The second step is to estimate M. The first step is general, in that it applies to any system and RLC configuration, while the second step differs according to the system and configuration. The method according to the invention shows how M may be estimated for UMTS systems. For other systems and configurations, M can be derived in a similar way.

N=maximum number of spurious retransmission PDUs (counted by y) corresponding to a retransmitted PDU within group 1 (counted by x1).

AF=activity factor in the considered direction, defined as the ratio of the total number of transmitted PDU's in the considered direction to the maximum number of PDUs that can be transmitted in the considered direction.

r_T=radio link BLER threshold for the considered direction. This is a configurable parameter.

r_o=radio link BLER in the opposite direction (i.e. if r is defined for the downlink, then r_o is defined for the uplink).

Tti: transmission time interval length in the considered direction (the same direction as defined for r).

Tti_o: transmission time interval length in the opposite direction.

m=maximum number of PDU's per Tti that can be transmitted in the considered direction, conform to the current radio access bearer (RAB) rate.

m_o=maximum number of PDU's per Tti that can be transmitted in the opposite direction, conform to the current radio access bearer (RAB) rate.

T=RLC layer round trip delay.

t=value of Timer_Status_Prohibit. Timer_Status_Prohibit is a configurable RLC layer parameter.

t'=actual status prohibit delay value.

t_p=the average time length needed to generate a status report if a maximum number of status reports are generated during a RLC layer round trip delay period T.

p=probability that a status report will be triggered during the last t_p period.

With the above notations, x, x1 and x2 can be expressed as follows:

$$x = \frac{r \cdot z}{1-r} \qquad \text{EQ 3}$$

$$x1 = (1-r)x \qquad \text{EQ4}$$

$$x = x1 + x2, x2 = rx \qquad \text{EQ5}$$

The PDU retransmission rate R in the considered direction can be computed according to the definition given by EQ2 and using y from EQ1, x from EQ3, x1 from EQ4:

$$R = \frac{x+y}{x+y+z} = \frac{x + M \cdot x_1}{x + M \cdot x_1 + \frac{1-r}{r} \cdot x} = \frac{r + M \cdot (1-r) \cdot r}{1 + M \cdot (1-r) \cdot r} \qquad \text{EQ 6}$$

EQ6 links R (PDU retransmission rate in the considered direction) with r (radio link BLER in the considered direction). Note that EQ6 is a general formula, which is applicable to any wireless system and RLC configuration. If M can be quantified, then EQ6 clearly quantifies the relation between R and r. However, for different systems and RLC parameters configuration, M could be derived differently.

The description below shows how to derive M for an UMTS system with a given RLC configuration.

Figure 3:
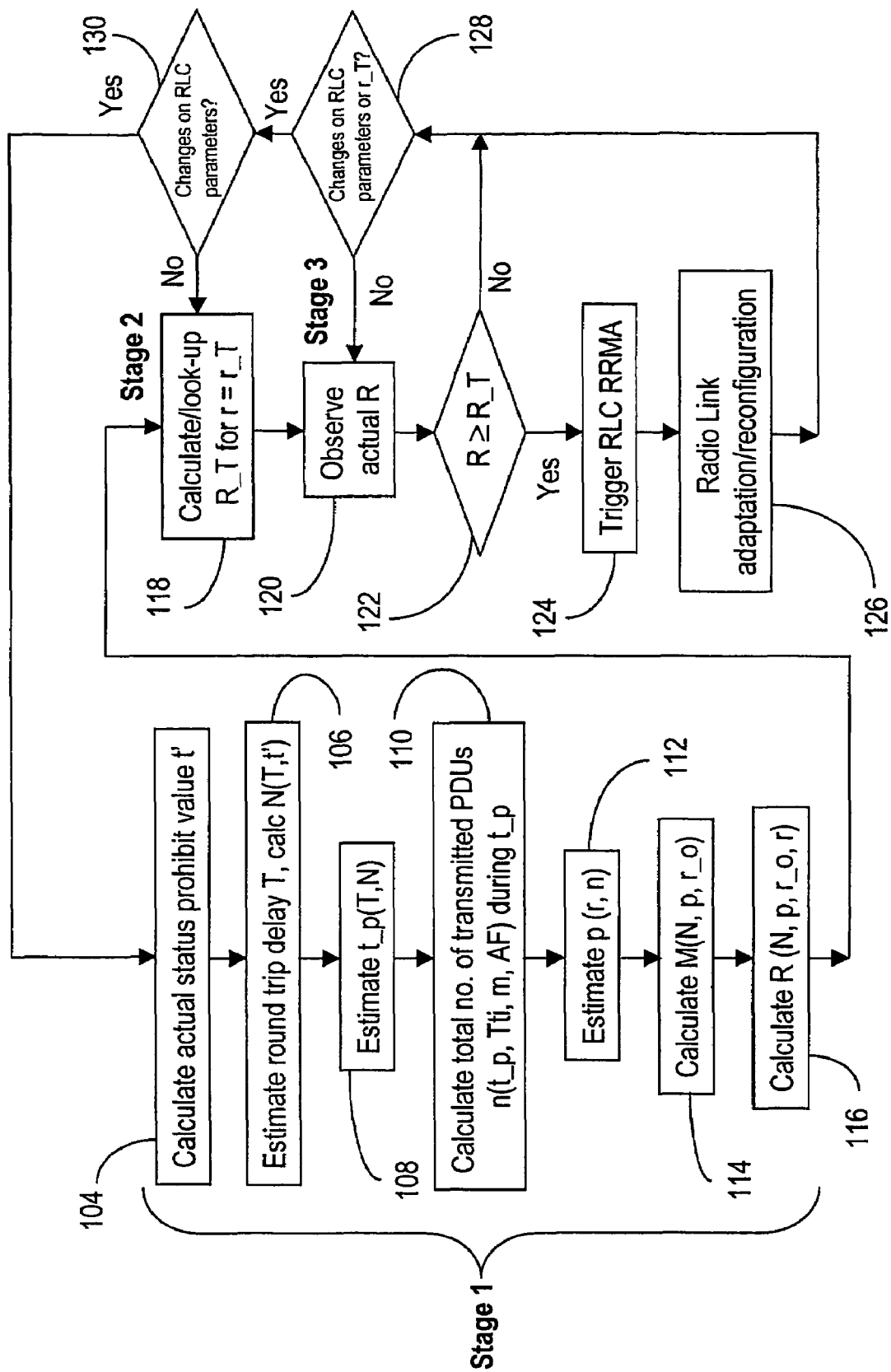
FIG. 3 is a flowchart of the method according to the invention.

The method according to the invention is performed as shown in the flowchart of FIG. 3 and described next.

Stage 1. Quantify the Relationship Between R (PDU Retransmission Rate in the Considered Direction) and r (Radio Link BLER in the Considered Direction)

In order to obtain M for UMTS system with a given RLC configuration, the maximum number of spurious retransmission PDUs (counted by y) corresponding to a retransmitted PDU in group 1 (counted by x1), N, is estimated, and the probability p that a status report will be triggered during the last t_p period, are determined from the value of Timer_Status_Prohibit, t, and the transmission time interval in the opposite direction, Tti_o, and shown by steps 104–116.

In step 104, the actual status prohibit value t' is computed as shown in EQ7:

$$t' = \left(FLOOR\left(\frac{t}{\text{Tti\_o}}\right) + 1\right) \cdot \text{Tti\_o} \qquad \text{EQ 7}$$

where FLOOR(j) is the largest integer that is not larger than j.

The round trip delay T is estimated in step 106, and used to calculate N:

$$N = CEIL\left(\frac{T}{t'}\right) - 1, \qquad \text{EQ 8}$$

where CEIL(x) is the smallest integer which is not smaller than x.

The average time length needed to generate a status report if the maximum number of status reports are generated during a RLC layer round trip delay period, t_p, is estimated in step 108, as shown in EQ 9:

$$t\_p = FLOOR\left(\frac{T}{N}\right) \quad \text{EQ 9}$$

Using the RLC layer traffic activity factor AF, the total number n of transmitted PDUs during the period t_p, is computed in step 110:

$$n = FLOOR\left(\frac{t\_p}{Tti} \cdot m \cdot AF\right) \quad \text{EQ 10}$$

The probability that a status report will be triggered during the last t_p period (see EQ9), is next calculated in step 112, as shown by EQ 11:

$$p = 1 - (1-r)^n \quad \text{EQ 11}$$

M, the average value of the spurious retransmitted PDUs corresponding to a retransmitted PDU within group 1, is estimated in step 114, according to EQ12.

$$M = N \cdot p \cdot (1 - r\_o) \quad \text{EQ 12}$$

Next, the RLC layer PDU retransmission rate may be determined in step 116 by substituting into EQ 6 with M from EQ12:

$$R = \frac{r + N \cdot p \cdot (1 - r\_o) \cdot (1-r) \cdot r}{1 + N \cdot p \cdot (1 - r\_o) \cdot (1-r) \cdot r} \quad \text{EQ 13}$$

This expression clearly quantifies the relation between R and r. Note that N and p are estimated through EQ8, EQ9, EQ10 and EQ11.

Stage 2. Determine the RLC Layer PDU Retransmission Rate

Using the expression determined for R in EQ13, the RLC layer observable threshold in the considered direction, R_T, may be computed in step 118 for the corresponding value of the BLER threshold r_T:

$$R\_T = \frac{r\_T + N \cdot p \cdot (1 - r\_o) \cdot (1 - r\_T) \cdot r\_T}{1 + N \cdot p \cdot (1 - r\_o) \cdot (1 - r\_T) \cdot r\_T} \quad \text{EQ 14}$$

Stage 3. Observe the Real Time RLC Observable in RNC RLC Layer

Next, the real time value R is observed in the RNC RLC layer in step 120. R is observed as the ratio of the number of retransmitted PDUs and the total number of transmitted PDUs (see EQ2) for a pre-defined period of time interval. The respective RRM algorithm(s) is/are triggered whenever:

$$R \geq R\_T, \quad \text{EQ 15}$$

as shown by branch "Yes" of decision block 122 and step 124. The RRMA will then perform a radio link adaptation/reconfiguration, shown in step 126.

If the real time value of R for a pre-defined time interval is lower than the threshold (as shown by branch "No" of decision block 122), and if neither the values of RLC layer parameters nor the layer 1 threshold r_T is changed (as shown by branch "No" of decision block 128), the step 120–122 are repeated for a pre-defined period of time interval.

If there is a change to the layer 1 threshold r_T (as shown by branch "Yes" of decision block 128) but there is no change to the values of RLC layer parameters (as shown by branch "No" of decision block 130), the step 118–122 is repeated for a pre-defined period of time interval.

If there is a change to the values of RLC layer parameters (as shown by branch "Yes" of decision block 130), the steps 104–122 are repeated for a pre-defined of time interval.

In addition, from EQ13 it can be shown that R is a monotonically increasing function of r, since both r and r_o are between 0 and 1. Hence $r \geq r\_T$ if and only if $R \geq R\_T$. This final observation validates the procedure above. Details of this demonstration are provided below.

$$R = \frac{x+y}{x+y+z} = \frac{r + N \cdot p \cdot (1 - r\_o) \cdot (1-r) \cdot r}{1 + N \cdot p \cdot (1 - r\_o) \cdot (1-r) \cdot r}$$

N is a constant which is not related to r.

$p = 1 - (1-r)^n$, where n is a non-negative constant integer which is not related to r.

r_o: a constant which is not related to r.

Defining $a = N \cdot (1 - r\_o)$, with r_o between 0 and 1, the parameter a is non-negative. R is then given by $$R = \frac{r + a \cdot r \cdot (1-r) \cdot (1 - (1-r)^n)}{1 + a \cdot r \cdot (1-r) \cdot (1 - (1-r)^n)}$$

To show that R is a monotonically increasing function of r, we need to show $dR/dr \geq 0$. $dR/dr$ can be computed as below:

$$dR/dr = \frac{\text{Numerator}}{(1 + a \cdot r \cdot (1-r) \cdot (1 - (1-r)^n))^2}$$

Hence we only need to show that the numerator of the dR/dr is $\geq 0$. This numerator is calculated as below:

$$\text{Numerator} = \frac{d(r + a \cdot r \cdot (1-r) \cdot (1 - (1-r)^n))}{dr} \cdot (1 + a \cdot r \cdot (1-r) \cdot$$
$$(1 - (1-r)^n)) - (r + a \cdot r \cdot (1-r) \cdot (1 - (1-r)^n)) \cdot$$
$$\frac{d(1 + a \cdot r \cdot (1-r) \cdot (1 - (1-r)^n))}{dr}$$
$$= (1 + a \cdot (1-r) \cdot (1 - (1-r)^n) - a \cdot r \cdot (1 - (1-r)^n) +$$
$$a \cdot r \cdot (1-r) \cdot n \cdot (1-r)^{n-1}) \cdot (1 + a \cdot r \cdot (1-r) \cdot (1 - (1-r)^n)) -$$
$$(r + a \cdot r \cdot (1-r) \cdot (1 - (1-r)^n)) \cdot (a \cdot (1-r) \cdot (1 - (1-r)^n) -$$
$$a \cdot r \cdot (1 - (1-r)^n) + a \cdot r \cdot (1-r) \cdot n \cdot (1-r)^{n-1})$$
$$= 1 + a \cdot (1-r)^2 \cdot (1 - (1-r)^n) + a \cdot r \cdot (1-r)^2 \cdot n \cdot (1-r)^{n-1}$$

Since r is between 0 and 1, both a and n are non-negative, it is clear that the above Numerator is $\geq 0$. Hence $dR/dr \geq 0$. We prove the result.

Simulation results show a very good match with the estimated results based on analytical relation derived above. Table 1 provides the values for the parameters of three examples of connections, and Table 2 provides the results obtained by simulation and the results obtained by using the above calculations for the examples provided in Table 1.

In the first example EXAMPLE 1, r is given, r_o is given (assume r_o=r). R can be obtained from EQ 13 as follows:

$$R = \frac{r + 2 \cdot (1 - (1-r)^n) \cdot (1-r)^2 \cdot r}{1 + 2 \cdot (1 - (1-r)^n) \cdot (1-r)^2 \cdot r} \quad \text{EQ 16}$$

In EXAMPLE 2 and 3, r is given, r_o is given (assume r_o=r), which gives a relationship between r and R as in EQ 16:

$$R = \frac{r + (1 - (1-r)^n) \cdot (1-r)^2 \cdot r}{1 + (1 - (1-r)^n) \cdot (1-r)^2 \cdot r} \quad \text{EQ 17}$$

The results for the above mentioned three examples were calculated using the respective equations in the second line of Table 1, and are shown in Table 2 for comparison with the simulation results for same examples.

TABLE 1

| CONNECTION PARAMETERS | EXAMPLE 1 | EXAMPLE 2 | EXAMPLE 3 |
|---|---|---|---|
| r | r is given, r_o = r | r is given, r_o = r | r is given, r_o = r |
| R | EQ 16 | EQ 17 | EQ 17 |
| Transmission rate RAB | 64/384 | 64/384 | 64/128 |
| Type of traffic | ftp | ftp | ftp |
| Activity Factor AF | 1 | 1 | 1 |
| Traffic (considered) direction | downlink | downlink | downlink |
| Timer status prohibit t | 100 ms | 140 ms | 140 ms |
| Transmission time interval in CD Tti | 10 ms | 10 ms | 20 ms |
| Transmission time interval in OD Tti o | 20 ms | 20 ms | 20 ms |
| Actual prohibit status delay t' (EQ 7) | 120 ms | 160 ms | 160 ms |
| Max number of PDU/Tti for CD m | 12 | 12 | 8 |
| RLC layer round trip time T | 280 ms | 280 ms | 290 |
| Max. number of spurious retransmissions N (EQ 8) | 2 | 1 | 1 |
| Average time for status report generation t_p (EQ 9) | 140 ms | 280 ms | 290 ms |
| No. of transmitted PDU/t_p n (EQ 10) | 168 | 336 | 112 |

TABLE 2

| Radio Link BLER OD r_o = r | | Probability for a Status Report During Last t_p p (EQ 11) | R Obtained by Simulations | R obtained using EQ 15 |
|---|---|---|---|---|
| EXAMPLE 1 | r = 1% | 0.8152 | 2.62 | 2.56 |
| | r = 5% | 0.9998 | 12.69 | 12.86 |
| | r = 10% | 1 | 22.50 | 22.55 |
| EXAMPLE 2 | r = 1% | 0.9658 | 1.94 | 1.93 |
| | r = 5% | 1 | 9.09 | 9.10 |
| | r = 10% | 1 | 16.76 | 16.74 |
| EXAMPLE 3 | r = 1% | 0.6756 | 1.59 | 1.65 |
| | r = 5% | 0.9968 | 9.06 | 9.09 |
| | r = 10% | 1 | 16.92 | 16.74 |

It should be understood that the preferred embodiments mentioned here are merely illustrative of the present invention. Numerous variations in design and use of the present invention may be contemplated in view of the following claims without straying from the intended scope and field of the invention herein disclosed

Having thus described the invention, what is claimed as new and secured by Letters Patent is:

1. In a wireless transmission system equipped with a radio network controller (RNC) hosting radio resource management algorithms for controlling operation of a base transceiver station (BTS), a method of controlling the performance of a radio link established between said base transceiver station and a radio terminal, comprising:
    monitoring from said RNC a L-2 parameter directly observable at said RNC;
    determining from said L-2 parameter a L-1 parameter, without explicit signaling between said RNC, said BTS and said radio terminal; and
    from a radio resource management algorithm, prompting the radio terminal and the RNC to perform a radio resource management action whenever said L-1 parameter violates a L-1 threshold.

2. The method claimed in claim 1, wherein said action comprises one of directly downgrading and upgrading the transmission rate on said radio link.

3. The method claimed in claim 1, wherein said action comprises a radio link reconfiguration.

4. The method claimed in claim 1, wherein said step of monitoring comprises:
    establishing a transfer function between said L-1 parameter and said L-2 parameter; and
    determining said L-1 parameter using said transfer function and said L-2 parameter.

5. The method claimed in claim 4, wherein said L-1 parameter is the radio block error rate r, and said L-2 parameter is PDU retransmission rate R.

6. The method claimed in claim 5, wherein said step of establishing comprises recording the number of transmitted PDUs and the number of retransmitted PDUs.

7. The method claimed in claim 6, wherein said step of establishing further comprises calculating an actual status prohibit value t'.

8. The method claimed in claim 7, wherein said step of establishing further comprises estimating a RLC layer roundtrip delay period T, and calculating a maximum number of spurious retransmissions N(T, t').

9. The method claimed in claim 8, wherein said step of establishing further comprises estimating the average time t_p to generate a status report if a maximum number of status reports are generated during said delay period T.

10. The method claimed in claim 9, wherein said step of establishing further comprises calculating the total number n of transmitted PDUs during t_p period.

11. The method claimed in claim 10, wherein said step of establishing further comprises estimating the probability p(r, n) that a status report will be triggered during the last t_p period.

12. The method claimed in claim 11, wherein said step of establishing further comprises calculating an average value M of the spurious retransmitted PDUs corresponding to a retransmitted PDU of the PDUs which were received successfully.

13. The method claimed in claim 12, wherein said step of establishing further comprises calculating the PDU retransmission rate R(N, p, r_o, r).

14. The method claimed in claim 1, wherein said step of determining comprises:
    obtaining an L-2 threshold for said L-2 parameter based on said transfer function and a configurable L-1 threshold for said L-1 parameter; and
    calculating said L-1 parameter from said L-2 parameter based on said transfer function.

15. The method claimed in claim 14, further comprising from said radio resource management algorithm, prompting both said radio terminal and said RNC to perform a radio resource management action whenever said L-2 parameter violates said L-2 threshold.

16. The method claimed in claim 14, wherein said L-1 parameter is the radio block error rate r, and said L-2 parameter is PDU retransmission rate R.

17. The method claimed in claim 16, wherein said transfer function provides the PDU retransmission rate R as a monotonically increasing function of the radio block error rate r according to formula:

$$R = \frac{r + N \cdot p \cdot (1 - r\_o) \cdot (1 - r) \cdot r}{1 + N \cdot p \cdot (1 - r\_o) \cdot (1 - r) \cdot r}$$

where N is the maximum number of spurious retransmission PDUs corresponding to a successfully retransmitted PDU and p is the probability that a status report will be triggered during the last t_p period.

18. The method claimed in claim 14, wherein said L-2 threshold is determined from an L-1 threshold for said L-1 parameter.

19. The method claimed in claim 18, wherein said L-1 threshold is a radio block error rate threshold r_T, and said L-2 threshold is a threshold retransmission rate R_T.

20. The method claimed in claim 19 wherein said transfer function provides said R_T as a function of said r_T according to formula:

$$R\_T = \frac{r\_T + N \cdot p \cdot (1 - r\_o) \cdot (1 - r\_T) \cdot r\_T}{1 + N \cdot p \cdot (1 - r\_o) \cdot (1 - r\_T) \cdot r\_T}$$

where N is the maximum number of spurious retransmission PDUs corresponding to a successfully retransmitted PDU and p is the probability that a status report will be triggered during the last t_p period, r_o is the radio block error rate in the opposite direction.

21. A method of obtaining physical layer (L-1) information at radio link control (RLC) layer (L-2) without explicit signaling between L-1 layer and L-2 layer, comprising:
    deriving a transfer function between a L-2 observable parameter and an L-1 status parameter;
    obtaining said L-2 observable parameter;
    applying said transfer function to obtain said L-1 status parameter based on the RLC parameters setting and on an estimation of physical layer information; and
    triggering a radio resource management action whenever said L-2 parameter violates a L-2 threshold.

22. The method claimed in claim 21, wherein said L-1 parameter is the radio block error rate r, and said L-2 parameter is PDU retransmission rate R.

23. The method claimed in claim 21, wherein said L-2 threshold is determined from an L-1 threshold for said L-1 parameter.

24. The method claimed in claim 22, wherein said L-1 threshold is a radio block error rate threshold r_T, and said L-2 threshold is a threshold retransmission rate R_T.

25. The method claimed in claim 21, wherein said transfer function provides the PDU retransmission rate R as a monotonically increasing function of the radio block error rate r.

* * * * *